Aug. 22, 1967      J. UNERTL, JR      3,336,831
CAM FOCUSING SYSTEM FOR OPTICAL INSTRUMENTS
Filed Aug. 8, 1963      2 Sheets-Sheet 1
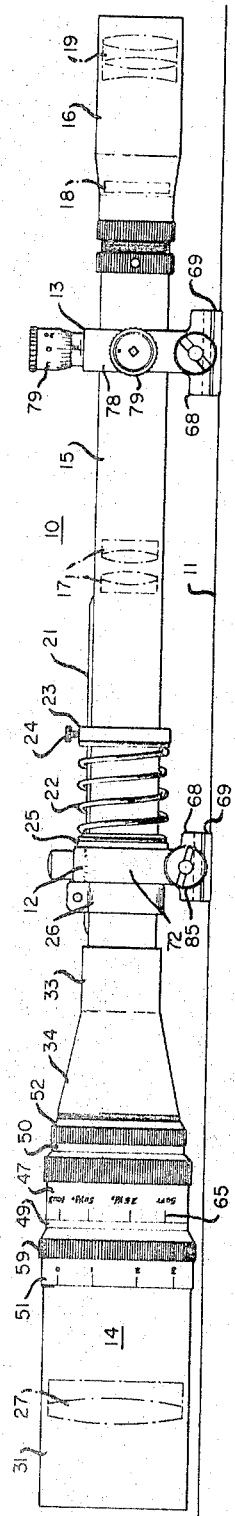
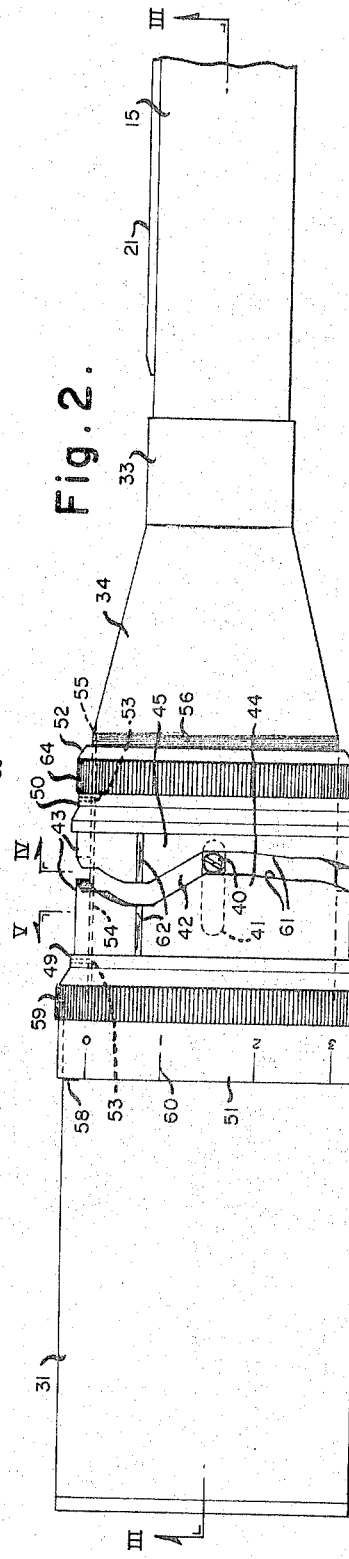
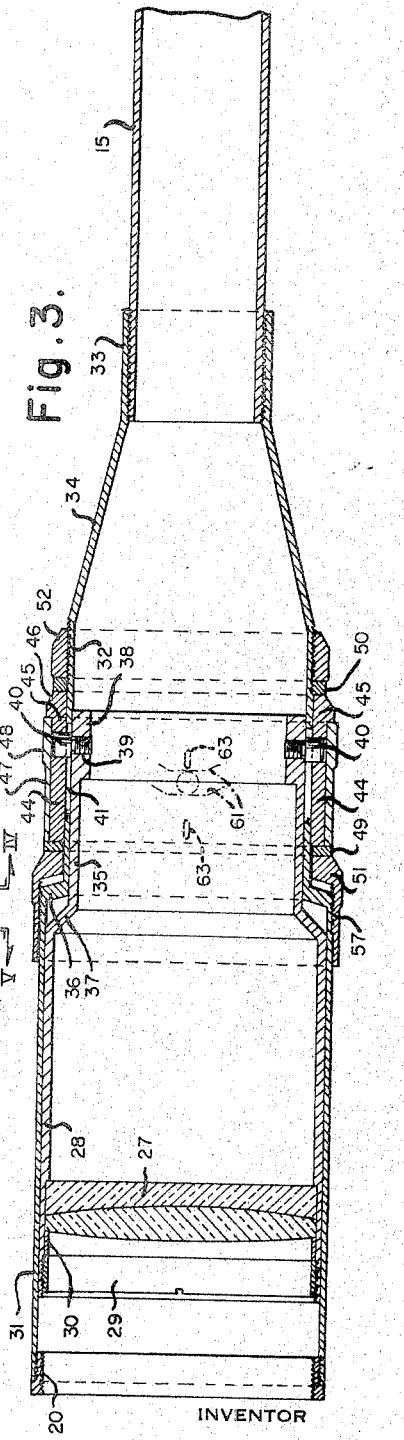
INVENTOR
John Unertl, Jr.
By Hoopes Leonard & Buell
his Attorneys Aug. 22, 1967  J. UNERTL, JR  3,336,831
CAM FOCUSING SYSTEM FOR OPTICAL INSTRUMENTS
Filed Aug. 8, 1963  2 Sheets-Sheet 2

INVENTOR
John Unertl, Jr.

United States Patent Office 3,336,831
Patented Aug. 22, 1967

3,336,831
CAM FOCUSING SYSTEM FOR OPTICAL
INSTRUMENTS
John Unertl, Jr., McCandless Township, Allegheny County, Pa. (9140 Fox Hunt Road, Pittsburgh, Pa. 15237)
Filed Aug. 8, 1963, Ser. No. 300,882
6 Claims. (Cl. 88—1)

This invention relates to a quick cam focusing device for optical instruments such as telescopic sights or the like. More particularly, this invention pertains to a lens movement system which quickly provides optimum range focus with considerable tolerance for the adjusting user. Additionally, vernier adjustment and accurately aligned surface engagement clamping mounts preferably are provided.

In rifle shooting, for example, in sporting and military circles, an optical instrument such as a telescopic sight is often utilized, such sight, or other optical instrument, having an objective lens system and an ocular system which may be inclusive of an erecting lens, the term lens being used in this specification to include both simple and compound lenses. In shooting matches as well as in other uses of guns with such sights, provision has to be made for focusing so as to eliminate parallax at a selected range, the range comprising the distance of the target or other object from the gun user. The time which the user may have in which to change the sight range may be limited so that there is insufficient time in which to make a very precise or critical adjustment. Additionally, in the course of shooting the mounts connecting the sight to the gun barrel must retain accurate alignment to hold the sight in true relation to the gun or rifle barrel and at the same time allow for selected elevation and windage adjustments. The assembly must be rugged enough to withstand normal outdoors usage of such optical sights and be trouble-free, particularly if used in areas removed from gunsmith's shops. The instant invention provides a novel lens system, preferably with novel mounts disclosed herein, to satisfy the most exacting demands placed upon optical instruments such as telescopic rifle and gun sights, or optical instruments for other uses and services having need of features of this invention.

Other objects and advantages of this invention will be apparent from the following description and the accompanying drawings, which are illustrative of one embodiment only, in which FIGURE 1 is a view in side elevation of a telescopic sight for a rifle embodying an objective lens system and mounts of this invention;

FIGURE 2 is a somewhat enlarged view in side elevation of the objective lens system shown in FIGURE 1 with the range ring removed for purposes of clarity in describing the invention;

FIGURE 3 is a view somewhat enlarged taken along line III—III of FIGURE 2 with the range ring replaced in operative position thereon;

Figure 9:
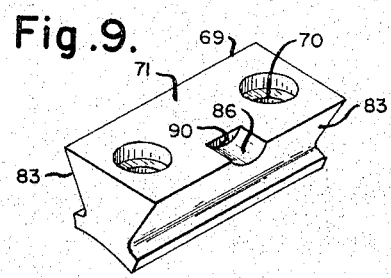
FIGURE 9 is a perspective view of a dovetail tenon used in connection with such front mount.

Referring to the drawings, a telescopic sight 10 is shown therein embodying one practice of this invention. The sight is shown mounted on a gun barrel 11 by a front mount 12 and rear mount 13 respectively secured to dovetail tenons, such as the one illustrated in FIGURE 9, bolted to the top of such gun barrel 11. Telescopic sight 10 is quick focusing inasmuch as it embodies an assembly 14 as an objective lens system of this invention which is threadably connected to an continued rearwardly by a lens barrel 15 terminating in an eyepiece 16. The contents of lens barrel 15 and eyepiece 16 are sometimes termed herein the ocular system and no claim to them per se is made herein. Such ocular system includes any desired annular diaphragms (not shown) in lens barrel 15, an erecting lens 17, a cross hairs reticule 18 and an ocular lens 19. The respective ends of sight 10 preferably are internally threaded, that for the front end being shown at 20, to receive a covering lens cap when the sight is not in use. Lens barrel 15 is provided with a longitudinally extending ridge rib 21 and urged rearwardly by a spring 22 the rear of which is fixed to retainer 23 encircling barrel 15 and held in selectively fixed position by a set screw 24 tightened against rib 21. The front of the spring is fixed to an annular retainer 25 which presses against the rear edge of front mount 12, the retainer 25 being free therefrom, to urge a clamp stop 26 fixed around barrel 15 up against the front edge of mount 12. In the use of gun 11, the gun will recoil faster causing a space to open up between stop 26 and mount 12, which space will be reclosed without damage to sight 10 as soon as the force of the recoil falls below the restoring force of spring 22. While mounts 12 and 13 hold sight 10 in accurately aligned position relative to gun 11, lens barrel 15 will momentarily slide axially therethrough upon occurrence of such recoil and return.

The objective system 14 comprises an objective lens 27 fixed in slidable barrel 28 by a cylindrical retainer 29 pressing against a cylindrical spacer 30 to hold the lens against a shoulder in barrel 28. Objective lens barrel 28 is slidable in a cylindrical guide 31 having a reduced intermediate portion 32 and a final reduced portion 33 where there is threaded coupling between assembly 14 and lens barrel 15, the portions 32 and 33 being connected by an integral conical portion 34. Similarly, barrel 28 has a rearward portion 35 adapted to slide in controlled contiguous relation to the inside of portion 32 of tubular guide 31. Flaring walls 36 and 37 respectively on the guide 31 and barrel 28 are also provided as integral connecting portions thereof respectively. The rear 38 of objective lens barrel 28 is transversely drilled and tapped by a pair of transverse radial holes 39, 180° apart. Each hole 39 receives the threaded end of a cam follower 40 which projects radially outwardly of portion 35 through a longitudinal slot 41 in portion 32 into a cam groove 42 in a cam ring 43. Cam ring 43 has two cylindrical parts, 44 to the front and 45 to the rear, such rear part having a peripheral flange 46 to be in rear limiting juxtaposition to the rear edge of a cylindrical range ring 47. Ring 47 has a milled turning band 48 thereon to enable the cam ring subassembly to be turned thereby whenever a retainer collar 52 is unscrewed slightly to unlock the cam ring and permit such turning. The axial length of cam ring 43 in front of flange 46 is but slightly greater than the axial length of focusing range ring 47 so that when retainer 52 is screwed up tight by hand, it will lock the assembly in the selected range position.

The two parts 44 and 45 of the cam ring 43 are held apart while locked by the predetermined width of groove 42 which in turn is determined by the diameter of the enlarged head of the cam followers 40, such heads preferably being polished so that the cam ring can be rotated readily when unlocked. Cam ring 43 is held together between a front bushing washer 49 and a rear bushing washer 50 which in turn are held in generally predetermined axial position, whether the cam ring 43 is in locked or unlocked positions, between an adjustable stop ring 51 and said retainer collar 52. Each bushing washer is provided with a radially inwardly projecting pin 53 which allows the bushing washer to be slid longitudinally of the axis of assembly 14, but not rotated, when pin 53 enters a longitudinal recess 54 open at the rear end 55 thereof along portion 32 of guide 31 in the course of being assembled. The rear end of that portion 32 is threaded at 56 to threadably engage collar 52, the bushing washer 50 (and 49 also) being free to slide over the threads on portions 32, as are parts 44 and 45. Stop ring 51 is internally threaded to engage threads 57 at the rear end of the portion of largest diameter on guide 31, the rear end of stop ring 51 comprising a reference stop for the front of bushing washer 49. Adjustment cross lines 58 are scribed on the top of tubular guide 31. The exterior of reference ring 51 ahead of the milled turning band 59 is provided with vernier scribings 60 around the entire circumference to the extent of ten thereof, each marking embracing 36° in the embodiment shown, to cooperate with markings 58. When the zero scribing on ring 51 is in line with the longitudinal line in reference 58, the front edge of ring 51 will be in transverse alignment with the cross line in marking 58. The turning of adjustment ring 51 can be used as a vernier to compensate for differences in parallax settings of sight 10 to bring the image in eyepiece 16 to sharpest definition, or to convert range markings on range ring 47, when they are in English standard distances, to metric range for a shooting match which may use metric distances. Any movement forward of ring 51 or rearwardly is followed or proceeded, respectively, by a resetting of retainer collar 52 to keep the assembly in assembled relation, whether the collar 52 is up tight to lock the cam ring at a selected range position for shooting, or backed off somewhat to enable the range and cam rings to be turned to select a new range setting. Once the reference ring 51 is adjusted, then normally the only further setting action required in use of gun 11 and sight 10 would be such a matter of a change in range which quickly can be handled by a turning of range ring 47 to the appropriate designation.

When range ring 47 is rotated in assembly 14, the followers 40 move longitudinally or dwell in accordance with the conformation of the sides 61 of groove 42. Such sides 61 are mirror images of each other and comprise the cam track of groove 42 and cam ring 43, the foremost side 61 being the rear edge of part 44 and the rearmost side 61 being the front edge of part 45. Such sides are held in peripheral alignment by the longitudinal registry of the two parts of a recess 62 in the parts 44 and 45 respectively. The two parts of recess 62 are held in alignment by front and rear dimples 63 on the inside of range ring 47, the part of recess 62 on cam ring part 45 being entered in the course of being assembled by the rearmost dimple 63 when the parts 44 and 45 are separated after retainer collar 52 has been backed off by the turning of its milled band 64, after which rear part 45 is shoved up under the range ring until the rear edge of the range ring virtually abuts flange 46, whereupon collar 52 is screwed back on to normal assembled position. FIGURE 3 illustrates in chain line outline the relative position of the dimples 63 and the sides 61 of groove 42 when recess 62 is in engagement with the respective dimples. Consequently, as ring 47 is turned slidable barrel 28 will not turn because the heads of followers 40 extend through slots 41, nor will barrel 28 move axially so long as such follower heads are on a dwell portion of the sides 61. Such sides 61, further, define duplicate cam tracks, one set for each follower 40, which are repeated in each 180° of angularity of groove 42 as best illustrated by reference to FIGURE 4.

Figure 5:
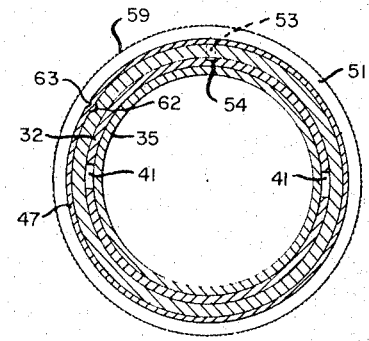
FIGURE 5 is a view in transverse section taken along line V—V of FIGURE 2.
Figure 4:
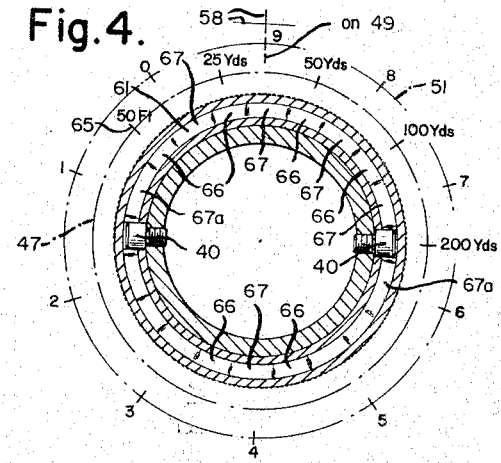
FIGURE 4 is a view in transverse section along the centerline of the cam groove in the cam ring as indicated generally by the position arrows IV—IV shown in FIGURE 2.
Figure 7:
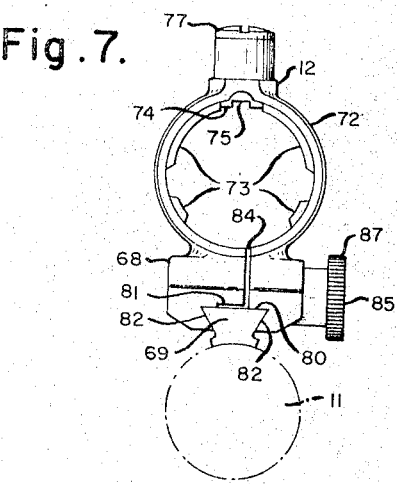
FIGURE 7 is a view in front elevation of such front mount.
Figure 6:
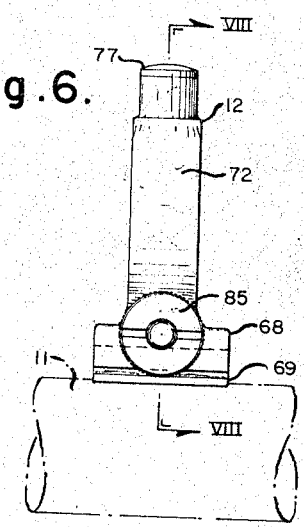
FIGURE 6 is an enlarged view in side elevation of the front mount shown in the embodiment of FIGURE 1, the mount bases of both front and rear mounts being substantially identical.
Figure 8:
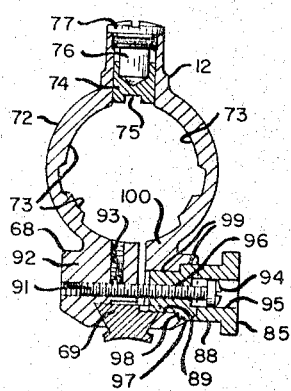
FIGURE 8 is a view in cross section taken along line VIII—VIII of FIGURE 6.

As shown in FIGURES 1 and 4, range ring 47 is provided with a series of scribed index markings 65 which in the illustration range from fifty feet through two hundred yards in unequal increments of object distance, but equal angular distance between markings. As shown, the range ring is marked for fifty feet, twenty-five yard, fifty yard, one hundred yard and two hundred yard distances. Beyond two hundred yards away from the gun user the target or object is normally shot at with the sight at the two hundred yard marking. The radial lines in the next to outermost circle in FIGURE 4 correspond to the index markings scribed on range ring 47 in the illustrated embodiment. Each such marking is in the center of a 15° dwell 66 which is connected to the next dwell 66 on the same side 61 by a slope portion 67 of that side 61. With dwells selected at fifteen angular degrees each, it is clear that the quick adjustment by a user of the gun in changing the range need not be made with micrometer precision. That is to say, even if the range scribing desired should be on one side or the other of the reference line, preferably made on bushing washer 49 in longitudinal alignment with the longitudinal line in marking 58, the focus will be correct, whatever adjustment, if any, requiring the action of stop 51 normally having already been taken. In the case of each dwell 66, the center of which is indicated by a radial line range marking, a duplicate dwell 66 exists 180° spaced therefrom in the same transverse plane normal to the axis of sight 10, although there may be no markings, as in the illustrated embodiment, on such other side of the range ring. Moreover, the range ring 47 can be turned through a complete revolution because groove 42 is continuous. Further, the axial distance between dwells follows the law of optics and therefore different axial distances separate such dwells occasioning different slopes 67 between dwells. Nonetheless, the angular distance covered by each dwell, as well as by each slope except the last, is angularly the same, respectively, the dwells extending for fifteen angular degrees and the slopes, save for the slope 67a between the end of the two hundred yard dwell and the beginning of the next fifty foot dwell, being twenty angular degrees. Other angular length selections may be made as desired. Moreover, by having the cam track in duplicate 180° parts as shown in FIGURE 4, the followers 40 are moved simultaneously, when moved by angular movement of ring 47, without any tendency for the slidable barrel 28 to be subjected to a moment tending to jam or twist the barrel 28 inside the guide 31.

Accuracy in the mounting and holding of sight 10 preferably is insured by utilizing front and rear mounts having surface engagement clamping bases 68, the one illustrated in FIGURES 6 to 9, inclusive, being taken from front mount 12, which respectively cooperate with a dovetail tenon such as tenon 69 having bolt holes 70 for bolts to fasten such tenon to the ridge of gun barrel 11 with heads of such bolts no higher than the top surface 71 of the tenon. Rear mount 13 may utilize such a tenon although it may be of different height, rear mount 13 also being provided with the same clamping base 68. The upper portions of the mounts 12 and 13 per se are not claimed herein. Such upper part of front mount 12 comprises a strap enclosure 72 encircling barrel 15 with arcuate bearing lands 73 to engage the lens barrel 15 and a plunger 74 having a recess 75 which engages rib 21 and is pressed thereagainst in slidable friction manner by a dowel 76 and cap 77. In the case of the rear mount 13, the enclosing strap 78 has both elevation and windage ratches 79 thereon for the horizontal and vertical alignment of the optical sight 10 relative to the gun 11 and its trajectory, each ratchet controlling a plunger and the third plunger being spring biased against lens barrel 15 in known manner.

Each clamping base 68 comprises a longitudinally extending dovetail mortise groove 80 having a longitudinal relief portion 81 along the top thereof and sides 82 to cooperate with and engage the respective sides 83 of the cooperating tenon 69. Each base moreover has a vertical kerf 84 extending from the mortise 80 through to the center of enclosure 72, or 78 as the case may be, to one side of the opening through the upper part of the mount. The natural springiness of the enclosures 72 and 78 is such that the kerf 84 tends to stay open unless and until the sides thereof are moved toward one another by a thumb screw 85, the sides 82 of the mortise 80 being adapted to engage sides 83 of the tenon before the kerf 84 is fully closed. In such way, the mounts are held in secure alignment by surface clamping engagement along the length of the respective tenons secured to the gun barrel itself. Any tendency to longitudinal movement of the mounts relative to their respective tenons is further prevented by the presence of a transverse arcuate notch 86 having an axis above the top 71 of the tenon and at right angles to the length thereof.

Each thumb screw 85 has a milled finger portion 87, a cylindrical clamping portion 88 and a reduced diameter portion 89, the latter of which in the course of clamping enters notch 86 although the inner end of portion 89 never reaches or bears against end 90 of notch 86 even when the mortise and tenon are in clamped relation to one another. A machine screw 91 has its bottom end fixed in cross position in the larger portion 92 of the base by a set screw 93. The upper part and head 94 of the screw 91 projects across the kerf 84 and through a bore and counterbore 99 the other side 100 of base 68. Head 94 remains free within an unthreaded central counterbore 95 in the outer end of thumb screw 85. A central bore 96 in the thumb screw 85 is in threaded engagement with the part of screw 91 below head 94, which acts as a stud. The annular shoulder 97 between portions 88 and 89 upon tightening thumb screw 85 engages a shoulder 98 between the bore and counterbore portions 99 through the other side 100 of base 68. Consequently, when mount 12 or 13 is to be fixed to its respective tenon, tenon 69 in the case of mount 12, the tenon is slid into the mortise 80, the thumb screw 85 having been turned to withdraw the narrower portion 89 out of reach of notch 86. Then when in position opposite that notch, thumb screw 85 is tightened and shoulder 97 presses shoulder 98 to narrow the kerf 84, cause portion 89 to enter notch 86 and bind sides 82 against the sides 83 of the tenon to provide a rigid immovable clamp mounting which cannot be offset or twisted, or removed unless and until thumb screw 85 is backed off releasing the grip of the respective mortise sides and removing part 89 from notch 86.

While the illustrated embodiment has been described in connection with a telescopic rifle sight it will be apparent that various details in assembly 14 and the clamping base 68 of mounts 12 and 13 may be altered, and other respective embodiments provided, without departure from the spirit of this invention or the scope of the appended claims.

I claim:

1. A quick focusing telescopic sight having objective and ocular systems and mounting means, comprising, in combination, an axially slidable objective lens barrel, a tubular guide for said barrel, a pair of laterally projecting cam followers fixed to said barrel and extending transversely outwardly therefrom 180° apart, said tubular guide having longitudinal slots through which said cam followers project as aforesaid, a rotatable adjustable stop ring in threaded engagement with said tubular guide, cooperating adjustment markings on said guide and stop ring respectively, a cylindrical cam ring having a continuous cam groove therein defining two duplicate track portions into which said cam followers respectively extend, a cylindrical range ring surrounding said cam ring in connected relation so that rotation of said range ring will rotate said cam track portions, front and rear bushing washers positioned adjacent each end of said cam ring, means preventing axial rotation of the bushing washers and permitting longitudinal movement of the bushing washers with respect to the tubular guide, cooperating range index markings on said front bushing washer and range ring, and a retainer collar threadably engaging said tubular guide at the rear of said rings to hold the assembly together in camming relation without hindering the rotatability of said range ring.

2. A quick focusing telescopic sight as set forth in claim 1, comprising, said cam groove having peripheral sides comprising said track portions, said sides being longitudinally opposed in mirror image relation, said track portions having arcuate transverse lands normal to the axis of said sight and of equal angular length, at least some of said lands further being spaced apart longitudinally by unequal distances, said lands still further being spaced apart peripherally by slopes of equal angular distance measured around the circumference of said range ring.

3. A quick focusing telescopic sight as set forth in claim 1, comprising, said tubular guide having a reduced diameter coupling portion at the rear end thereof adapted to threadably engage the remainder of said sight and an axially extending recess enterable horizontally at the rear end thereof, said bushing washers having a radially inwardly extending pin adapted to slide into assembled position in said axially extending recess, said cam ring being of entirely distinct parts separated peripherally at said groove, the sides of said groove comprising said cam track portions in mirror image relation across the width of said groove and in juxtaposition to said followers in the assembly, a longitudinal recess in each of the separated portions of said cam ring enterable from the respective groove side of each thereof, said longitudinal recess in each part of said cam ring being adapted to be held in axial alignment to align said sides respectively, said range ring having axially spaced radially inward projections to enter the longitudinal recess in the respective parts of said cam ring.

4. A cam focusing optical instrument having a lens, comprising, in combination, an axially movable barrel in which said lens is mounted, a tubular guide for said barrel, at least one laterally projecting cam follower connected to said barrel and extending transversely outwardly therefrom, a cylindrical cam ring having a continuous cam track, said cam ring having two longitudinally spaced parts movable axially relative to one another, the longitudinal spacing between said parts comprising a cam groove defining said cam track into which said cam follower extends, means for selectively changing the range of said optical instrument by rotation of said cam ring when said parts are not pressed in axial binding relation against said cam follower, and means for pressing said cam parts toward one another to bind said cam follower in the last selected range position for said optical instrument.

5. A quick focusing telescopic sight having objective and ocular systems and mounting means, comprising, in combination, an axially slidable objective lens barrel, a tubular guide for said barrel, a pair of laterally projecting cam followers fixed to said barrel and extending transversely outwardly therefrom 180° apart, said tubular guide having longitudinal slots through which said cam followers project as aforesaid, a front stop member, a cylindrical cam ring having a continuous cam groove therein defining two duplicate track portions into which said cam followers respectively extend, said cam ring being of entirely distinct parts separated peripherally at said groove, the sides of said groove comprising said cam track portions in mirror image relation across the width of said groove and in juxtaposition to said followers in the assembly, a longitudinal recess in each of the separated portions of said cam ring enterable from the respective groove side of each thereof, said longitudinal recess in each part of said cam ring being adapted to be held in axial alignment to align said sides respectively, a cylindrical range ring surrounding said cam ring in connected relation so that rotation of said range ring will rotate said cam track portions, said range ring having axially spaced radially inward projections to enter the longitudinal recess in the respective parts of said cam ring, range index markings on said range ring, and a retainer collar threadably engaging said tubular guide at the rear of said rings to hold them in assembled relation without hindering the rotatability of said range ring when said retainer collar is slackened.

6. A cam focusing optical instrument having a lens, comprising, in combination, an axially movable barrel in which said lens is mounted, a tubular guide for said barrel, at least one laterally projecting cam follower connected to said barrel and extending transversely outwardly therefrom, a cylindrical cam ring having a continuous cam track in operative association with said cam follower, said cam ring having two longitudinally spaced parts movable axially relative to one another, the longitudinal spacing between said parts comprising a cam groove defining said cam track into which said cam follower extends, a cylindrical range ring in connected relation to said cam ring to rotate said cam track and longitudinally move said barrel, said cam track having arcuate transverse lands normal to the axis of said optical instrument and of equal angular length, at least some of said lands further being spaced apart longitudinally by unequal distances, said lands still further being spaced apart peripherally by slopes of equal angular distance measured around the circumference of said range ring, means for selectively changing the range of said optical instrument by rotation of said range ring when said parts are not pressed in axial binding relation against said cam follower, and means for pressing said cam parts toward one another to bind caid cam follower in the last selected range position for said optical instrument.

References Cited
UNITED STATES PATENTS

| | | | |
|---|---|---|---|
| 1,734,438 | 11/1929 | Koehler | 95—45 X |
| 2,184,351 | 12/1939 | Langsner | 88—32 |
| 2,740,328 | 4/1956 | Boughton et al. | 88—57 |
| 3,058,391 | 10/1962 | Leupold | 88—32 |
| 3,161,716 | 12/1964 | Burris et al. | 88—32 |
| 3,190,628 | 6/1965 | Litzka | 74—57 X |

DAVID H. RUBIN, *Primary Examiner.*

JEWELL H. PEDERSER, *Examiner.*

J. M. GUNTHER, *Assistant Examiner.*